United States Patent Office 3,330,978
Patented July 11, 1967

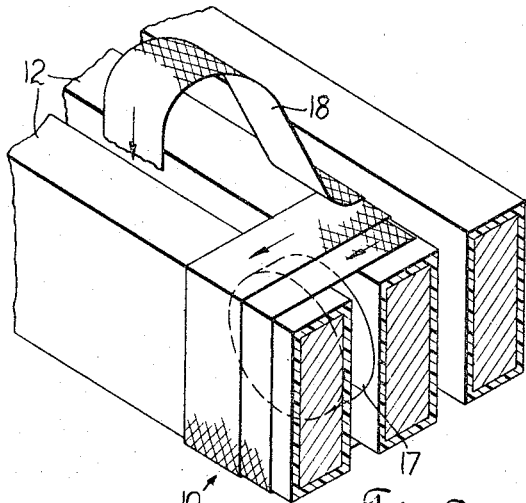
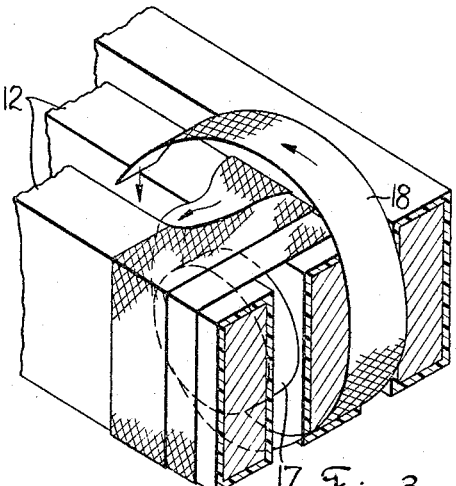
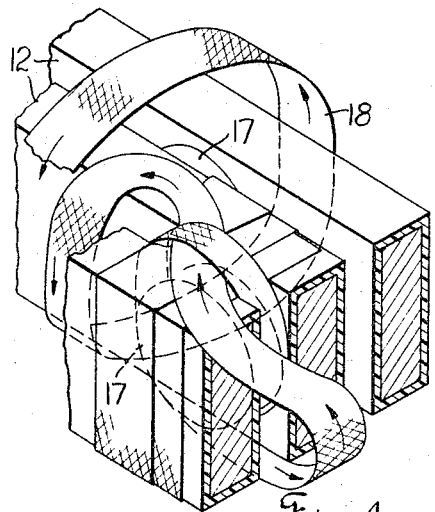
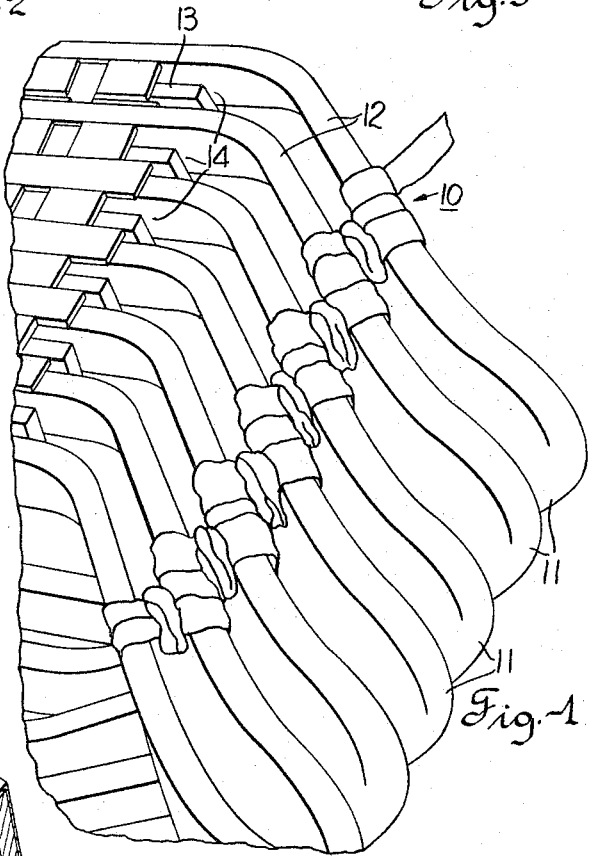
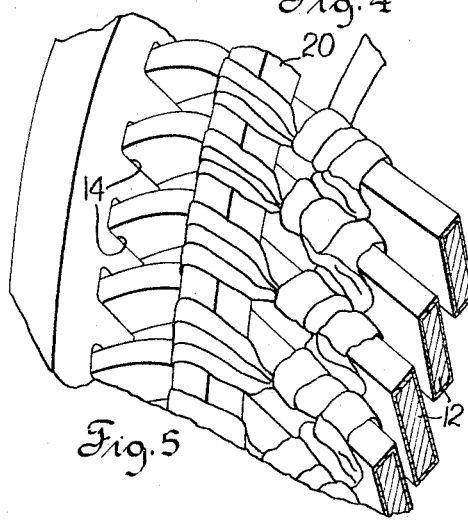

3,330,978
COIL END SUPPORT ASSEMBLY
Charles R. Pettit, Milwaukee, Wis., assignor to Allis-Chalmers Manufacturing Company, Milwaukee, Wis.
Filed Apr. 3, 1964, Ser. No. 357,121
3 Claims. (Cl. 310—260)

This invention relates generally to the support of the extensions or end turns of coils of large dynamoelectric machines. More specifically, this invention relates to a new and improved combination spacer and tying arrangement to hold the end turns of the electrical coils in proper spaced relationship and to retain them against movement.

In large dynamoelectric machines in which the stator coils extend beyond the ends of the core, the extensions or end turn portions of these coils are frequently subjected to large magnetic and mechanical forces which cause the end turns to move. Over an extended period of time, this movement is harmful to the winding causing the conductor or the insulation of the coil to prematurely fail. There have been many attempts made in the motor industry to support and tie the windings of the dynamoelectric machine to prevent excessive movement of the end turns and thereby reduce premature failures of the machine due to coil or insulation breakdown. Some of the supports used in the prior art are preformed blocks which are wedged between adjacent coils and then tied to a ring surrounding the outer periphery of the winding. Other methods of supporting the end turns include the use of formable pads impregnated with thermal setting resin which are wedged between adjacent coils and then heated to set the resin in the pads and thereby form a rigid support for the end turns.

Some of the problems of the block type arrangements of the prior art in addition to the high expense of installation were the excessive wear by the blocks on the tying cords during vibration of the machine and the difficulty in holding the wedged blocks in position between the coils. One of the problems with the thermal setting pads is the difficulty in the field of removing the pad to replace individual coils which might fail without having to replace more than the damaged coil.

Applicant has overcome the problem with the prior art coil supports by providing a novel tying and spacer system. The spacers are substantially flat disks which fit between the end turns of adjacent coils. These spacers are held in place by a suitable tape which both encircles the spacer and is wound around adjacent coils. The tape material is preferably a heat shrinkable material so that when heated the tape forms a snug fit for the spacers and the coils and easily holds them in position against vibration and other forces incurred during operation. In addition, the coils may be tied to an annular ring extending around the outer periphery of the coils. In this arrangement a limited amount of relative movement between adjacent coils is possible without causing excessive wear on the tying cords or displacing the spacers.

Therefore, it is the object of this invention to provide a new and improved system for blocking and tying the end turns of the coils of a dynamoelectric machine.

Another object of this invention is to provide a new and improved coil support for dynamoelectric machines capable of withstanding substantial forces applied to it.

Another object of this invention is to provide a coil support that will not become displaced due to vibration of the coils.

Other objects and advantages will be apparent from the following description when read in connection with the accompanying drawings, in which:

FIG. 1 is a cut-away perspective view of a portion of the end turns of coils of a dynamoelectric machine;

FIGS. 2, 3 and 4 illustrate the various steps in the method of tying the coil spacer in position and lacing the end turns to a support member; and FIG. 5 is a cut away perspective view of a portion of the end turns of coils of a dynamoelectric machine with the coils tied to a coil support ring.

As illustrated in the drawings, the coil support means 10 of this invention is shown in connection with supporting the coil extensions or end turns 11 of the winding coils 12 in the core 13 of a dynamoelectric machine. The coils 12 are positioned in arcuately spaced winding slots 14 in the core 13 and the end turns 11 extend beyond the ends of the core and extend back through another core slot.

The support means 10 comprises substantially flat spacers 17 positioned between adjacent coils 12 and held in position by a suitable tape 18. The tape 18 encircles the spacer between adjacent coils and is wound around adjacent coils and the included spacer to tie the coils together and to hold the spacer in position. The spacers are preferably round or oval to avoid any sharp edges that might cause excessive wear on the tape. The tying tape used in this invention is preferably a heat shrinkable material such as the Polyester Tie Tape, No. K5030P sold by Carolina Narrow Fabric Company of Winston-Salem, N.C. Preferably, a continuous length of tape should be used to tie all of the spacers and coils of the machine together. The coils and the spacers may be tied to an annular support ring 20 that extends around the outer periphery of the coils by looping the tying tape around the support ring as is well known in the art.

The coil extensions are tied and supported by initially positioning a spacer 17 between adjacent coils 12 and winding the tape 18 around the adjacent coils and the spacer therebetween. Then the tape is brought between the adjacent coils and wound around the spacer. Next, the tape is taken beyond the next adjacent coil and slightly staggered from the first spacer. A second spacer is positioned between these two adjacent coils including one of the previously taped coils and the tape is then wound around these coils and spacer in the same manner as described above. Usually two or three turns are taken around the coils and the spacer and then two or three turns between the coils and around the spacer in a plane perpendicular to the plane of the first two turns.

The following is a detailed description of one specific method of tying and blocking the coil end turns of a winding to a coil support ring in accordance with this invention. After positioning a coil support ring around the end turns of the coils, a spacer 17 is inserted between a pair of adjacent coils. Then three turns of tape are applied around the two coils, spacer and coil support ring with a half hitch tie on the third turn, tightened at the outside diameter of the ring. Following this tying of coils and spacer to the support, the continuing end of the tape is taken towards the bore along the side of the coil adjacent to the winder, then away from the bore between the two coils along the core edge of the spacers. Two turns of tape are now applied around the spacers themselves and the coil support ring with a half hitch tie on the air gap side of the spacer after one and one-half turns. After the tie, the continuing end of the tape is brought away from the bore between the two coils along the core edge of the spacers and under the coil support ring. The end of the tape is now pulled to tighten the half hitch on the air gap side of the spacer. The tape now makes one turn around the coil support ring itself close to the last assembled coil and in the space which will exist between that assembled coil and the next coil to be tied.

When all the end coils have been tied and blocked with spacers, the tape is heated up and allowed to contract so as to form a stiff, tight coil bracing for all the end turns of the machine.

Although but two embodiments of this invention have been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. In a dynamoelectric machine having a core with arcuately spaced slots and coils positioned in said slots and extending axially beyond said core, a support assembly comprising: spacers positioned between adjacent coil end extensions, a tape wound around said adjacent coil end extensions and said spacer between said coil end extensions, said tape further being wound around said spacer intermediate said adjacent coil end extensions in a plane substantially parallel to said coil end extensions.

2. In a dynamoelectric machine having a core with arcuately spaced slots and coils positioned in said slots and extending axially beyond said core, a support assembly comprising: flat substantially circular spacers positioned between each adjacent coil end extensions, a heat shrinkable tape wound around said adjacent coil end extensions and said spacer between said coil end extensions, said tape further being wound around said spacer intermediate said adjacent coil extensions in a plane substantially parallel to said coil end extensions, said tape forming a continuous strand to form an integral support.

3. In a dynamoelectric machine having a core with arcuately spaced slots and coils positioned in said slots and extending axially beyond said core, a support assembly comprising: an annular support ring extending around the outer periphery of said coil extensions, spacers positioned between each adjacent spaced coil end extension, a heat shrinkable tape wound around each coil end extensions and around said spacer between said coil end extensions, said tape further being wound around said spacer intermediate said adjacent coil end extensions and looped around said support ring, said tape forming a continuous strand to form an integral support.

References Cited

UNITED STATES PATENTS

| | | | |
|---|---|---|---|
| 2,437,990 | 3/1948 | Askey | 310—260 |
| 2,774,899 | 12/1956 | Zeissler | 310—260 |
| 2,994,735 | 9/1961 | Marshall | 310—270 |
| 3,027,476 | 3/1962 | Coggeshall | 310—260 |
| 3,089,048 | 5/1963 | Bahn | 310—260 |
| 3,135,888 | 6/1964 | Coggeshall | 310—260 |

MAX L. LEVY, *Primary Examiner.*

J. W. GIBBS, *Assistant Examiner.*